United States Patent
Otte et al.

(10) Patent No.: US 9,605,927 B2
(45) Date of Patent: Mar. 28, 2017

(54) DISRUPTOR DEVICE SIMULATION SYSTEM

(71) Applicant: Ti Training Corp., Golden, CO (US)

(72) Inventors: Gregory Otte, Golden, CO (US); Todd R. Brown, Golden, CO (US); Joseph J. Mason, Golden, CO (US)

(*) Notice: Subject to any disclaimer, the term of this patent is extended or adjusted under 35 U.S.C. 154(b) by 412 days.

(21) Appl. No.: 13/964,683

(22) Filed: Aug. 12, 2013

(65) Prior Publication Data

US 2014/0045146 A1 Feb. 13, 2014

Related U.S. Application Data

(63) Continuation of application No. 61/682,088, filed on Aug. 10, 2012.

(51) Int. Cl.
*G09B 9/00* (2006.01)
*F41G 3/26* (2006.01)
*F41A 33/02* (2006.01)
*F41H 13/00* (2006.01)

(52) U.S. Cl.
CPC ............ *F41G 3/2655* (2013.01); *F41A 33/02* (2013.01); *F41G 3/2627* (2013.01); *G09B 9/003* (2013.01); *F41H 13/0012* (2013.01)

(58) Field of Classification Search
CPC .... F41G 3/2655; F41G 3/2622; F41G 3/2627; F41A 33/02
USPC ......................................................... 434/21
See application file for complete search history.

(56) References Cited

U.S. PATENT DOCUMENTS

| | | | | |
|---|---|---|---|---|
| 6,174,169 | B1* | 1/2001 | Gerber | 434/11 |
| 6,821,124 | B2* | 11/2004 | Healy et al. | 434/22 |
| 7,291,014 | B2* | 11/2007 | Chung | F41A 33/00 434/11 |
| 8,356,438 | B2* | 1/2013 | Brundula et al. | 42/1.08 |
| 9,033,711 | B2* | 5/2015 | Guenther et al. | 434/19 |
| 2003/0228557 | A1* | 12/2003 | Abe | 434/21 |
| 2004/0146840 | A1* | 7/2004 | Hoover | F41G 3/2627 434/21 |
| 2006/0265929 | A1* | 11/2006 | Haney | 42/116 |
| 2007/0122770 | A1* | 5/2007 | Swensen | 434/16 |
| 2007/0287132 | A1* | 12/2007 | LaMons | F41A 33/00 434/11 |
| 2007/0297117 | A1* | 12/2007 | Elliott | 361/232 |

(Continued)

*Primary Examiner* — Sam Yao
*Assistant Examiner* — Michael Humphrey
(74) *Attorney, Agent, or Firm* — Leyendecker & Lemire, LLC

(57) ABSTRACT

A disruptor device simulation system is described. Embodiments of the of the simulation system include a disruptor device, one or more training cartridges, and a simulator system. The disruptor device can be loaded with training cartridges and implemented in a training scenario. The training cartridges can include a pair of infrared lasers and an infrared emitter. The simulator system can alter the training scenario based detecting pulses of light generated by the lasers and signals from the infrared emitter. In one embodiment, the simulator system can be adapted to determine when a trigger of the disruptor device is pulled and when an arc switch of the disruptor device is pressed. The simulator system can include a sensor adapted to detect the pulses of light generated by the pair of lasers. The simulator system can further include a receiver adapted to detect signals generated by the emitter.

14 Claims, 6 Drawing Sheets

(56) References Cited

U.S. PATENT DOCUMENTS

| | | | |
|---|---|---|---|
| 2009/0081619 A1* | 3/2009 | Miasnik | 434/21 |
| 2010/0203483 A1* | 8/2010 | Jones et al. | 434/21 |
| 2011/0091840 A1* | 4/2011 | Odorisio | 434/22 |
| 2013/0130204 A1* | 5/2013 | Lim | 434/22 |
| 2013/0337415 A1* | 12/2013 | Huet | 434/21 |
| 2013/0344461 A1* | 12/2013 | Tello | 434/21 |
| 2014/0322673 A1* | 10/2014 | Uhr | 434/21 |
| 2015/0010887 A1* | 1/2015 | Foege | 434/21 |

* cited by examiner

DISRUPTOR DEVICE SIMULATION SYSTEM

CROSS-REFERENCE TO RELATED APPLICATION

This application claims the benefit of U.S. Provisional Application No. 61/682,088, filed 10 Aug. 2012.

BACKGROUND

Conducted electrical weapons (CEWs), including the TASER® X2 CEW marketed by TASER International, Inc., are used by police officers and civilians alike as a less-lethal alternative to firearms. Proper training and handling are paramount to successfully using a CEW both effectively and safely.

Since a CEW is intended to be used sparingly, it is difficult to train with a CEW without firing expensive cartridges. Police departments typically handle training officers in using a CEW, however, it can be costly to repetitively practice with one as CEW cartridges are generally more expensive than ammunition for firearms. To become effective in using a CEW, a user must continuously practice similar to becoming proficient with a firearm.

A means for simulating firing a CEW is needed. More specifically, a system for practicing with a CEW in a simulated environment is needed that implements various training models and methods.

DETAILED DESCRIPTION

Figure 1:
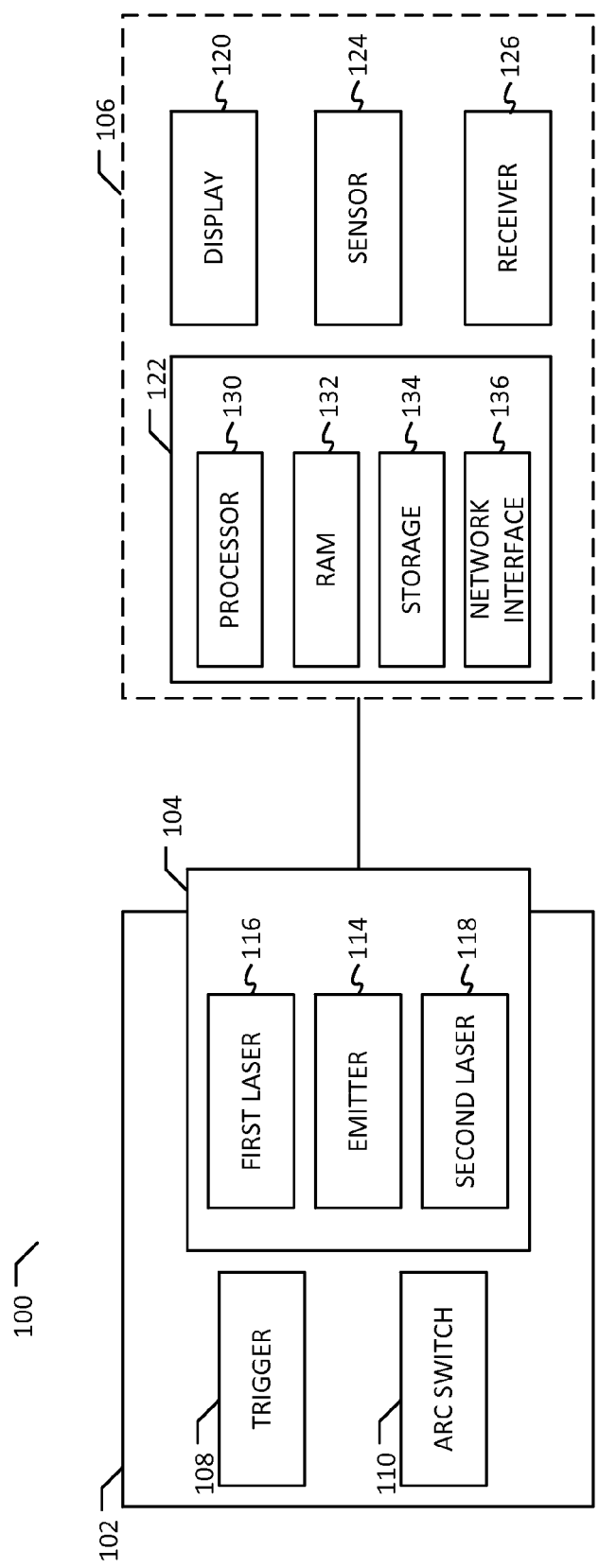
FIG. 1 is a block diagram of a disruptor device simulation system according to one embodiment of the present invention.

Embodiments of the present invention include special training-only cartridges that work with a disruptor device. For instance, the disruptor device can be a TASER® X2 conducted electrical weapon (CEW) marketed by TASER International, Inc. Generally, the training cartridges can be used in place of live cartridges ordinarily implemented with a CEW and a use of force simulator system. In one embodiment, the simulator system can be a portable system including a computer processing unit, display mechanism, and a sensor. The sensor can be adapted to determine when the training cartridge has been fired in conjunction with a training scenario being played.

In one embodiment, the training cartridges can be implemented to test a full functionality of the disruptor device. The simulator system can include a variety of training scenarios adapted to test the full functionality of the disruptor device in conjunction with the training cartridges. For instance, the training cartridges can act similar to live cartridges for purposes of the training scenario. In one embodiment, two training cartridges can be used with an active TASER® X2 CEW.

In one example, a first training cartridge can be fired and then a TASER® X2 CEW can be ready to fire a second training cartridge. In a training scenario, a user can also press a button, known as an arc switch on the TASER® X2 CEW, to switch back to the first cartridge and send the simulated recipient a timed stimulus current through the first cartridge. If there is a second perpetrator or if the shot of the first cartridge missed a target, the second training cartridge can be used to disable the second perpetrator by pulling the trigger again. In some embodiments, when the trigger is pulled after both cartridges have been fired, the simulator system can simulate both recipients getting a timed stimulus current. The arc switch button can also be used to send another stimulus current to simulated recipients hit by simulated probes.

Embodiments of the present invention can mimic actions of a TASER® X2 CEW in a simulated environment. Namely, two training cartridges can be inserted into the TASER® X2 CEW, then while a simulation is run the two cartridges can communicate with the simulator system to mimic the firing and operation of live cartridges and provide feedback. The feedback can include, but is not limited to, accuracy of a shot by a user, reaction times of the user, and actions performed by the user during the training scenario. It is to be appreciated that the training cartridges can be disabled while a safety of the disruptor device is engaged. In some embodiments, batteries can be implemented to power the training cartridges. In other embodiments, the training cartridges can be powered by the disruptor device.

The TASER® X2 CEW can include a first button and a second button that can permit a user to (i) display an arc, (ii) fire each cartridge individually to deploy electrodes at a human target then conduct for a few seconds, and/or (iii) repeat a stimulus current application for an already fired pair of electrodes. The stimulus current generally causes a human target to comply with commands of a user through pain or causing involuntary muscle contraction that stops the human target from further noncompliant actions.

While the following description is made relative to the TASER® X2 CEW model, it is appreciated that similarly functioning training cartridges and methodology can be utilized with other disrupter devices whether manufactured by TASER International, Inc. or another company. For example, the TASER® X3 CEW model that can implement three cartridges.

U.S. Design Pat. No. D651,679, issued 3 Jan. 2012, U.S. Design Pat. No. D630,290, issued 4 Jan. 2011, and U.S. Pat. No. 8,061,073, issued 22 Nov. 2011 are hereby incorporated in their entirety by reference.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment", "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The terms "couple" or "coupled," as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

The term "software," as used in this specification and the appended claims, refers to programs, procedures, rules, instructions, and any associated documentation pertaining to the operation of a system.

The term "firmware," as used in this specification and the appended claims, refers to computer programs, procedures, rules, instructions, and any associated documentation contained permanently in a hardware device and can also be flashware.

The term "hardware," as used in this specification and the appended claims, refers to the physical, electrical, and mechanical parts of a system.

The terms "computer-usable medium" or "computer-readable medium," as used in this specification and the appended claims, refers to any medium that can contain, store, communicate, propagate, or transport the program for use by or in connection with the instruction execution system, apparatus, or device. The computer-usable or computer-readable medium can be, for example but not limited to, an electronic, magnetic, optical, electromagnetic, infrared, or semiconductor system, apparatus, device, or propagation medium. By way of example, and not limitation, computer readable media can comprise computer storage media and communication media.

The term "signal," as used in this specification and the appended claims, refers to a signal that has one or more of its characteristics set or changed in such a manner as to encode information in the signal. It is to be appreciated that wireless means of sending signals can be implemented including, but not limited to, Bluetooth, Wi-Fi, acoustic, RF, infrared and other wireless means.

The term "disruptor device," as used in this specification and the appended claims, refers to a conducted electrical weapon (CEW) including, but not limited to, an electro-shock weapon, stun gun, and electronic control device.

The term "arc switch," as used in this specification and the appended claims, refers to an ARC user interface available on a TASER® X2 CEW. ARC is an acronym for three functions: Arc display, Re-energize, and rotate Cartridge.

The term "live cartridge" or "live cartridges," as used in this specification and the appended claims, refer to single use cartridges generally containing a propellant and two wire-tethered electrodes for use with a conducted electrical weapon.

A First Embodiment of a Disrupter Device Simulation System

Referring to FIG. 1, a block diagram of a disrupter device simulation system 100 is illustrated. Generally, the disrupter device simulation system 100 can be implemented for training users on how to properly use a disrupter device. In one embodiment, the simulation system 100 can be implemented with a TASER® X2 CEW.

The disrupter device simulation system 100 can generally include a disruptor device 102, a training cartridge 104, and a simulator system 106. In some embodiments, the disruptor device simulation system 100 can include two or more training cartridges.

The disruptor device 102 can typically include a first button 108 and a second button 110. In one embodiment, the first button 108 can be a trigger and the second button 110 can be an arc switch. For instance, where the disruptor device is a TASER® X2 CEW, the trigger 108 can fire a live cartridge and the arc switch 110 can create an electric arc used to deter a suspect. It is to be appreciated that the disruptor device 102 can include more or less buttons.

Figure 6:
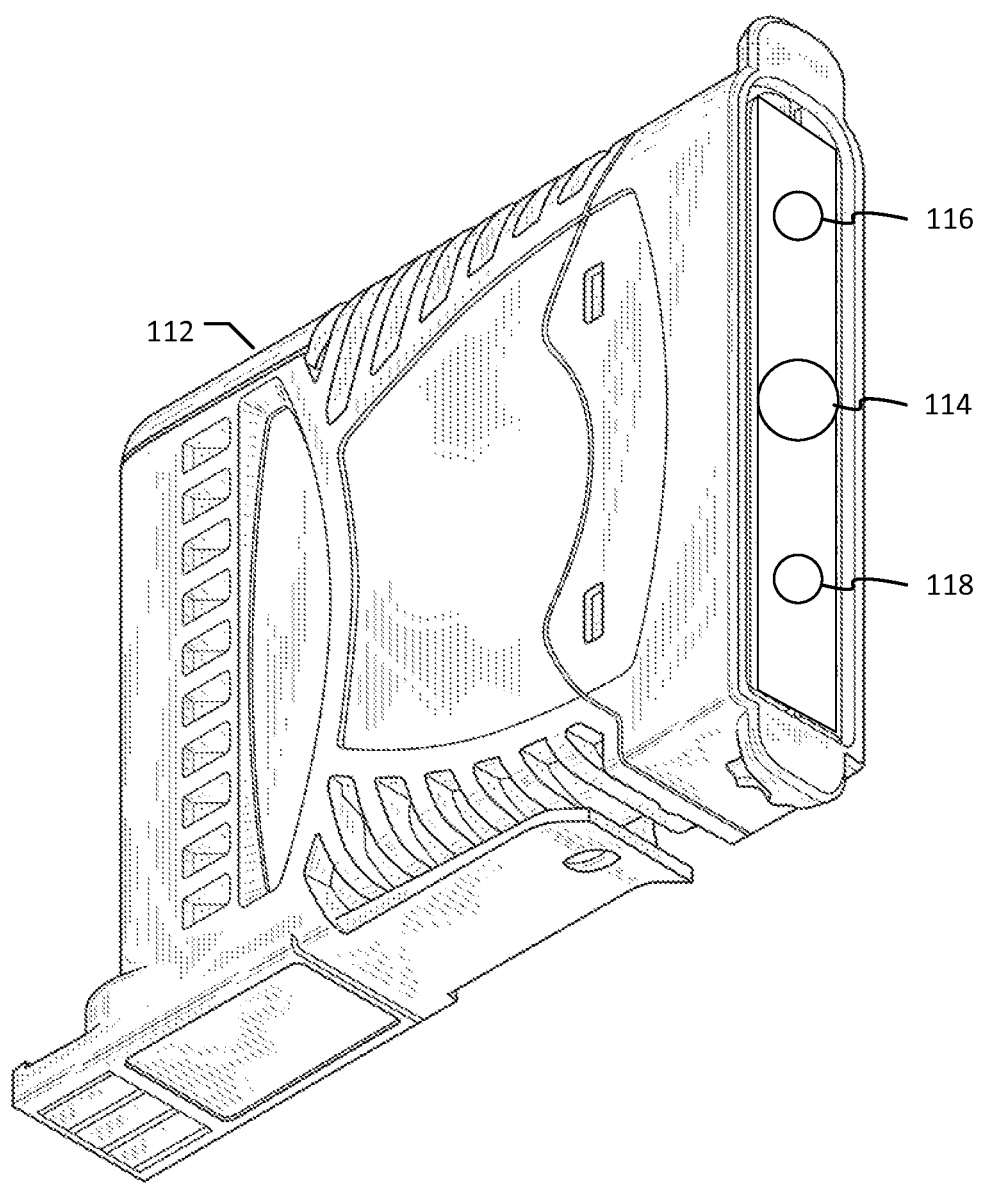
FIG. 6 is a side view of a cartridge shell according to one embodiment of the present invention.

Generally, the training cartridge 104 can include a cartridge shell 112 (shown in FIG. 6), an emitter 114, a first laser 116, and a second laser 118. The cartridge shell 112 can be similar to an active cartridge for a disrupter device. For instance, the cartridge shell 112 can appear similar to a live or active cartridge for use with the TASER® X2 CEW, as shown in FIG. 6. In one embodiment, the cartridge shell 112 can be adapted to be loaded into a TASER® X2 CEW. Generally, the cartridge shell 112 can be colored such that the cartridge can be distinguished from a live cartridge.

The emitter 114 can be adapted to transmit a wireless signal in response to the arc switch 110 being pressed. For instance, the emitter 114 can transmit a signal including, but not limited to, a radio frequency signal, an infrared signal, and a Bluetooth signal. In one embodiment, the emitter 114 can be a light emitting diode (LED). The LED emitter 114 can generate an infrared signal to transmit to the simulator system 106. The emitter 114 can typically be omnidirectional such that a signal transmitted from the emitter 116 can be received by a suitable receiver of the simulator system 106. It is to be appreciated that the emitter 114 can be adapted to transmit a variety of wireless signals.

The first laser 116 and the second laser 118 can be adapted to generate a pulse of light with a wavelength in the infrared spectrum in response to the trigger 108 being pulled. For instance, the first laser 116 and the second laser 118 can each generate a pulse of light with a wavelength of 785 nm plus or minus 50 nm. Typically, lasers adapted to generate pulses of light not visible to a human are implemented including, but not limited to, infrared spectrum lasers. It is to be appreciated that other means of generating waves in the non-visible light spectrum can be implemented without exceeding the scope of the present invention.

In one embodiment, the first laser 116 and the second laser 118 can be set with substantially a seven degree difference between them. For instance, the first laser 116 can be oriented parallel with a top level of the disrupter device 102 and the second laser 118 can be set at a seven degree angle down from the first laser 116. In this manner, the first laser 116 and the second laser 118 can mimic an actual trajectory of two probes fired from a live cartridge. Generally, the first laser 116 and the second laser 118 can be unidirectional and can typically be registered by the simulator system 106 when the laser beams are projected on a simulator display mechanism.

Typically, the first laser 116 will generate a pulse of light first and then the second laser 118 will generate a pulse of light. For instance, the first laser 116 can generate a pulse of light and then 300 ms later, the second laser 118 can generate a pulse of light. It is to be appreciated that the staggered firing times of the first laser 116 and the second laser 118 can be altered without exceeding the scope of the present invention. In one embodiment, the first laser 116 and the second laser 118 can each generate a pulse of light with the same wavelength. In another embodiment, the first laser 116 can generate a pulse of light with a different wavelength than the pulse of light generated by the second laser 118.

The first laser 116 and the second laser 118 can each generate a pulse of light for a set amount of time. For instance, the pulse of light generated by the first laser 116 and the second laser 118 can last 8 ms. In another instance, the pulses of light can last 44 ms. In yet another instance, the pulses of light can last 108 ms. In one embodiment, the simulator system 106 can determine between disruptor devices based on pulse lengths configured for each training cartridge inserted into the disruptor devices. For instance, a first disruptor device with a training cartridge can be calibrated to fire a pulse of light lasting 108 ms. A second disruptor device with another training cartridge can be calibrated to fire a pulse of light lasting 74 ms. As such, two disruptor devices can be implemented in a training scenario.

The simulator system 106 can include a display 120, a control module 122, a sensor 124, and a receiver 126. The control module 122 can be adapted to run a program or application which can decipher signals received by the sensor 124 and the receiver 126.

The control module 122 can include a processor 130, a random access memory 132, and a nonvolatile storage 134 (or memory). The processor 130 can be a single microprocessor, multi-core processor, or a group of processors. The random access memory 132 can store executable code as well as data that may be immediately accessible to the processor 130, while the nonvolatile storage 134 can store executable code and data in a persistent state. The control module 122 can also include a network interface 136. The network interface 136 can include hardwired and wireless interfaces through which the control module 122 can communicate with other devices and/or networks.

The display 120 can include, but is not limited to, a liquid crystal display, a plasma display panel, a light-emitting diode display, and a digital projector. The sensor 124 can be implemented to detect pulses of light generated by the first laser 116 and the second laser 118 in the training cartridge 104.

The receiver 126 can include, but is not limited to, a universal serial bus receiver. In one embodiment, the USB receiver 126 can be connected to the simulator system 106 through a universal serial bus port of the control module 122. The USB receiver 126 can be configured to receive a signal transmitted by the emitter 114. For example, when the emitter 114 includes an infrared emitter, the receiver 126 can be adapted to receive an infrared signal.

Generally, the training cartridge 104 can electrically connect to the disrupter device 102. For instance, an electrical connection can be made between the trigger 108 and the first laser 116 and the second laser 118. The arc switch 110 can have an electrical connection to the emitter 114.

In one embodiment, a signal can be transmitted from the disrupter device 102 to the training cartridge 104 indicating whether the trigger 108 has been pulled or the arc switch 110 has been pressed. The training cartridge 104 can be configured to determine whether the signal (or electrical current) transmitted by the disrupter device 102 is a trigger pull or an arc switch press. For instance, when the trigger 108 is pulled, the disrupter device 102 can generate a first voltage signal. In one example, the first voltage signal can be between 9-12 volts. When the arc button 110 is pressed, a second voltage signal can be generated. In one embodiment, the second voltage signal can have a higher voltage than the first voltage signal. It is to be appreciated that the first voltage signal can have a higher voltage than the second voltage signal.

In one embodiment, in response to the second voltage signal, the emitter 114 can transmit a wireless signal. In response to the first voltage signal, the first laser 116 and the second laser 118 can each generate a pulse of light.

Generally, once the training cartridge 104 can be loaded into the disruptor device 102, the disruptor device can send a low current signal to the training cartridge 104. If the disruptor device 102 detects a low resistance, then the disruptor device 102 can determine that an unfired cartridge has been loaded into a chamber of the disruptor device 102. If the disruptor device 102 detects a high resistance, the disruptor device 102 can determine that a fired training cartridge is in a chamber of the disruptor device 102. When the disruptor device 102 detects an infinite resistance, the disruptor device 102 can determine that there are no cartridges loaded.

The simulator system 106 can run a training scenario preloaded with options on how the disrupter device 102 will react with a training cartridge 104 inserted into the disruptor device 102. For instance, the simulator system 106 can present a user interface to select whether the disrupter device 102 is in a manual mode, a semi-automatic mode, or a customized mode. In one embodiment, the simulator system 106 can present a user interface to select which chamber of the disrupter device 102 is currently active. For instance, if the disrupter device 102 is a TASER® X2 CEW, a user can be prompted to select a right chamber or a left chamber. Based on this information, the simulator system 106 can determine which actions a user is taking based on how the user interacts with the disrupter device 102. For instance, the simulator system 106 can receive a signal from the training cartridge 104 and determine whether a user pulled a trigger or pressed an arc switch.

The simulator system 106 can run a plurality of training scenarios. The training scenarios can be configured to change a sequence of events presented to a trainee based on signals received from the training cartridge 104. For instance, a training scenario can branch into one or more sequences in response to signals received from the training cartridge 104. In one example, a training scenario can present a situation where a trainee should intend to shoot a perpetrator with a disruptor device. If the user pulls a trigger of the disruptor device and hits the perpetrator, the training scenario can branch to a video of the perpetrator being taken down by the disruptor device. If the user misses, the training scenario can branch to a video of the perpetrator escaping. In another example, the training scenario could call for a trainee to caution a crowd by showing an arc. In such a scenario, if the trainee presses the arc switch, the training scenario could branch to a video of the crowd dissipating. If the trainee pulls the trigger or does not react soon enough, the training scenario could branch to a video of the crowd escalating in violence or charging the trainee. Typically, the simulator system 106 can alter a training scenario being presented to a trainee based on signals received from the training cartridge.

A First Method of Implementing a Disrupter Device Simulation System

Figure 2:
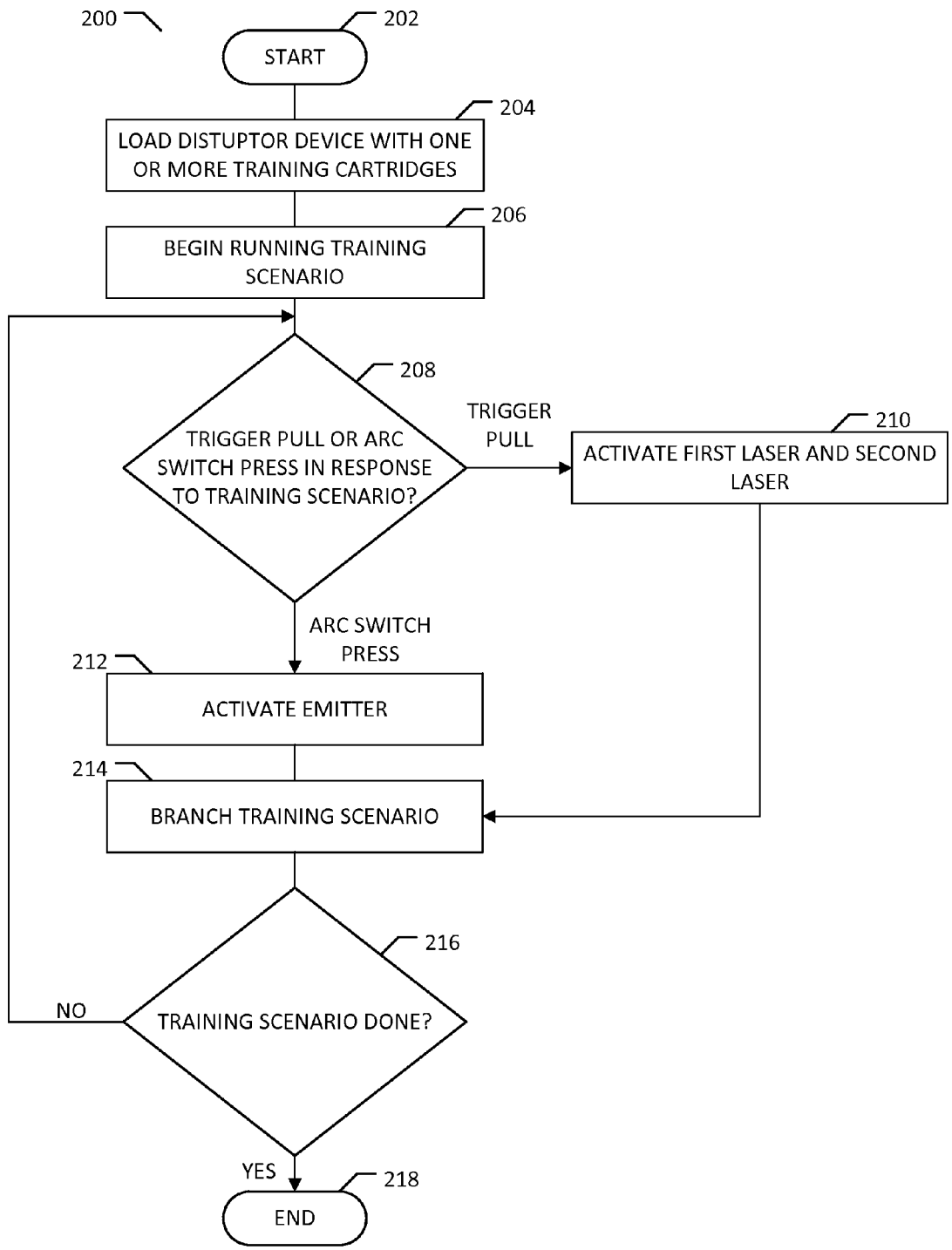
FIG. 2 is a flow chart illustrating a method of implementing a disruptor device simulation system according to one embodiment of the present invention.

Referring to FIG. 2, a flow chart illustrating a method or process 200 for implementing a disruptor device simulation system is illustrated. The process 200 is one example of implementing the previously disclosed disruptor device, training cartridge, and simulator system.

In block 202, the process 200 can start.

One or more training cartridges can be loaded into the disruptor device in block 204. In one embodiment, the training cartridge can electrically couple to the disruptor device. Generally, the training cartridges can be marked to indicate that the cartridges are for training purposes.

The simulator system can begin to run a training scenario in block 206. The simulator system can include a plurality of training scenarios adapted to test each function of the disruptor device. The training scenario can follow a plurality of different paths depending on how a user interacts with the disruptor device. For instance, the training scenario can branch one of three ways depending on whether the user pulls the trigger, presses the arc switch button, or does not react soon enough. If the situation calls for the user to pull the trigger and fire at a perpetrator, and if the simulator system determines the shot hit the perpetrator, the training scenario can branch to a video of the perpetrator being taken down. The training scenario can branch to other videos if the user pressed the arc switch button or did not react soon enough.

In block 208, the process 200 can determine if a user pulled a trigger or pressed an arc switch of the disruptor device in response to the training scenario.

If the user pulls the trigger, a pair of lasers in the training cartridge will each generate a pulse of light in block 210. The generated pulses of light can be detected by the simulator system. The simulator system can be adapted to detect an exact location of where the pulses of light hit a display of the simulator system. The simulator system can include an application or program that can determine if the pulses of light hit a target of the training scenario. The simulator system can branch from a path the training scenario is following when detecting the pulses of light and whether they hit an intended target.

In block 212, an emitter of the training cartridge can generate an infrared signal when the arc switch is pressed. The simulator system can include a receiver adapted to detect the infrared signal generated by the emitter. The simulator system can branch from a path the training scenario is following when detecting an arc switch press.

The path of the training scenario can be branched in block 214. Generally, the training scenario can be branched when there is a trigger pull or an arc switch press. In one embodiment, the training scenario can be branched when the simulator system does not detect either a trigger pull or an arc switch press.

In block 216, the process 200 can determine if the training scenario is done. If the training scenario is not done, the process 200 can return to block 208. If the training scenario is done, the process 200 can end in block 218.

One Embodiment of a Training Cartridge

Figure 3:
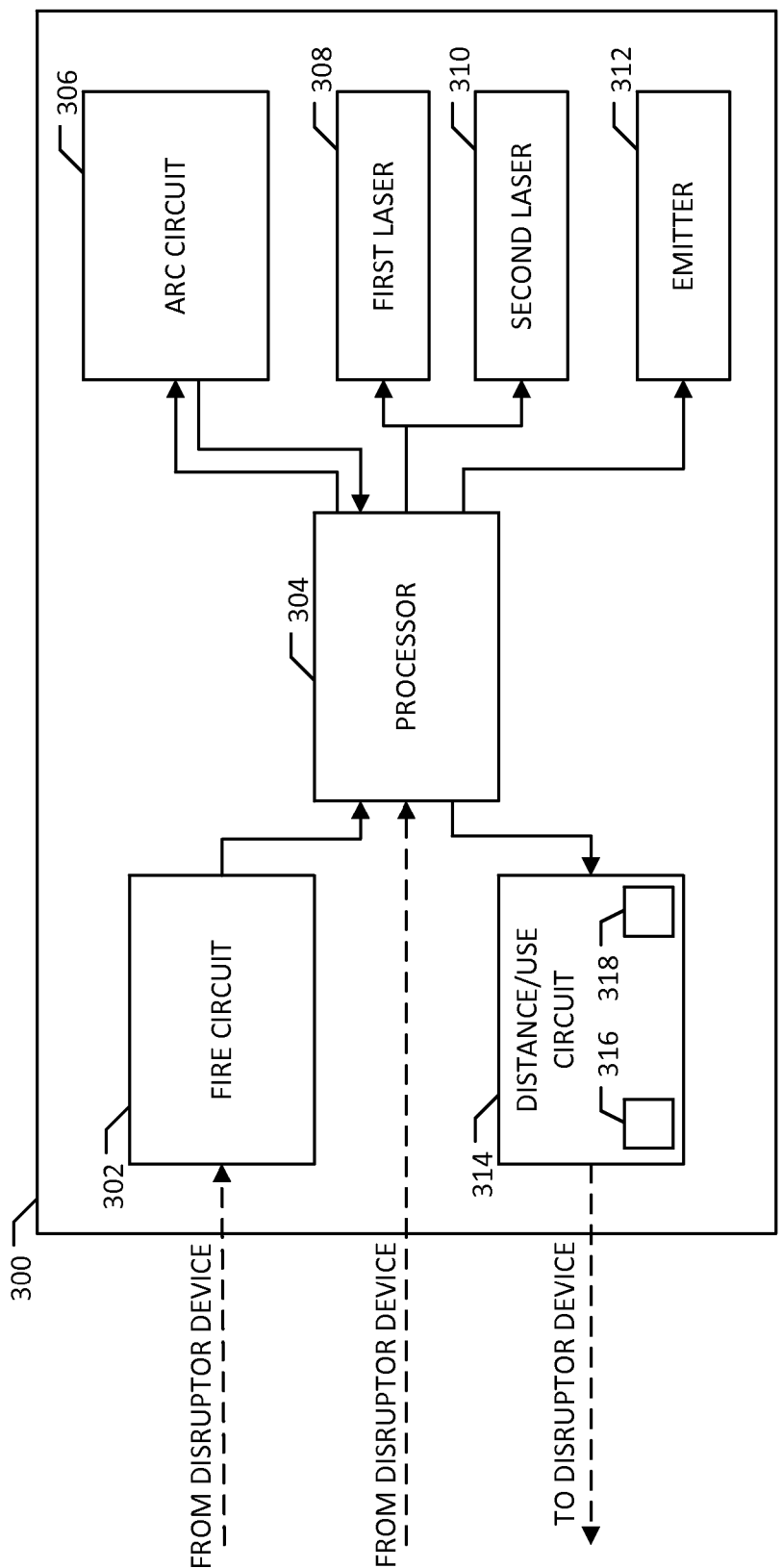
FIG. 3 is a block diagram of a training cartridge according to one embodiment of the present invention.

Referring to FIG. 3, a block diagram of a training cartridge 300 is illustrated. The training cartridge 300 can be implemented with a disruptor device to simulate live cartridges.

As shown, the training cartridge 300 can include a first circuit 302, a processor 304, a second circuit 306, a first laser 308, a second laser 310, an emitter 312, and a third circuit 314.

Generally, the first circuit 302 can be implemented as a fire circuit, the second circuit 306 can be implemented as an arc circuit, and the third circuit can be implemented as a distance/use circuit. The processor 304 can be a single microprocessor, multi-core processor, or a group of processors.

In one embodiment, the fire circuit 302 can be a voltage divider. For instance, the fire circuit 302 can receive a voltage signal from a disruptor device and output a lower voltage signal to the processor 304. In one example, the disruptor device can generate a voltage signal when a button of the disruptor device is activated. The fire circuit 302 can receive the voltage signal and output a lower voltage signal to the processor 304. In response to receiving the low voltage signal from the fire circuit 302, the processor 304 can output an activate signal to the first laser 308 and the second laser 310.

The arc circuit 306 can include a pair of terminals. When a high enough voltage is applied to the arc circuit 306, an electric arc can occur between the pair of terminals. In one embodiment, a disruptor device can generate a high voltage signal and apply the high voltage signal to the arc circuit 306 through the processor 304. While arcing, the arc circuit 306 can generate an arcing signal in response to the high voltage signal. The arcing signal can be sent to the processor 304.

In response to receiving the arcing signal from the arc circuit 306, the processor 304 can activate the emitter 312. In one embodiment, the emitter 312 can be adapted to emit an infrared signal. For instance, the emitter 312 can be a light emitting diode. It is to be appreciated that a variety of emitters can be implemented in the training cartridge 300. For instance, the emitter can transmit a signal including, but not limited to, a radio frequency signal, an infrared signal, and a Bluetooth signal.

In one example, the emitter 312 can be a light emitting diode. The LED 312 can have a 25 degree viewing angle. The LED 312 can transmit a signal with information that includes, but is not limited to, an arc switch press and whether a safety for the disruptor device is engaged or not.

In one embodiment, the distance/use circuit 314 can include a first switch 316 and a second switch 318. The processor 304 can change a position of the first switch 316 based on whether the processor 304 has received the low voltage signal from the fire circuit 302. In one example, the first position of the first switch 316 can provide a signal to a disruptor device indicating that the training cartridge 300 has not been fired. In response to receiving the low voltage signal, the processor 304 can change the first switch to a second position. The second position can provide a signal to the disruptor device indicating that the training cartridge 300 has been fired. For instance, the second position of the first switch can include a path with a resistor that changes a voltage of the low voltage signal. In response to receiving the lower voltage signal from the distance/use circuit 314, the disruptor device can know the training cartridge was fired.

The second switch 318 can be implemented to provide the disruptor device with a signal determining a simulated probe length of the training cartridge. It is to be appreciated that live TASER® X2 CEW cartridges have probes with varying lengths of effectiveness. Generally, live TASER® X2 CEW cartridges come with effective ranges between 15 to 35 feet. In one embodiment, the second switch 318 can be implemented to change the training cartridge 304 from a simulated 25 foot range to a 35 foot simulated range.

A Second Embodiment of a Disrupter Device Simulation System

Figure 4:
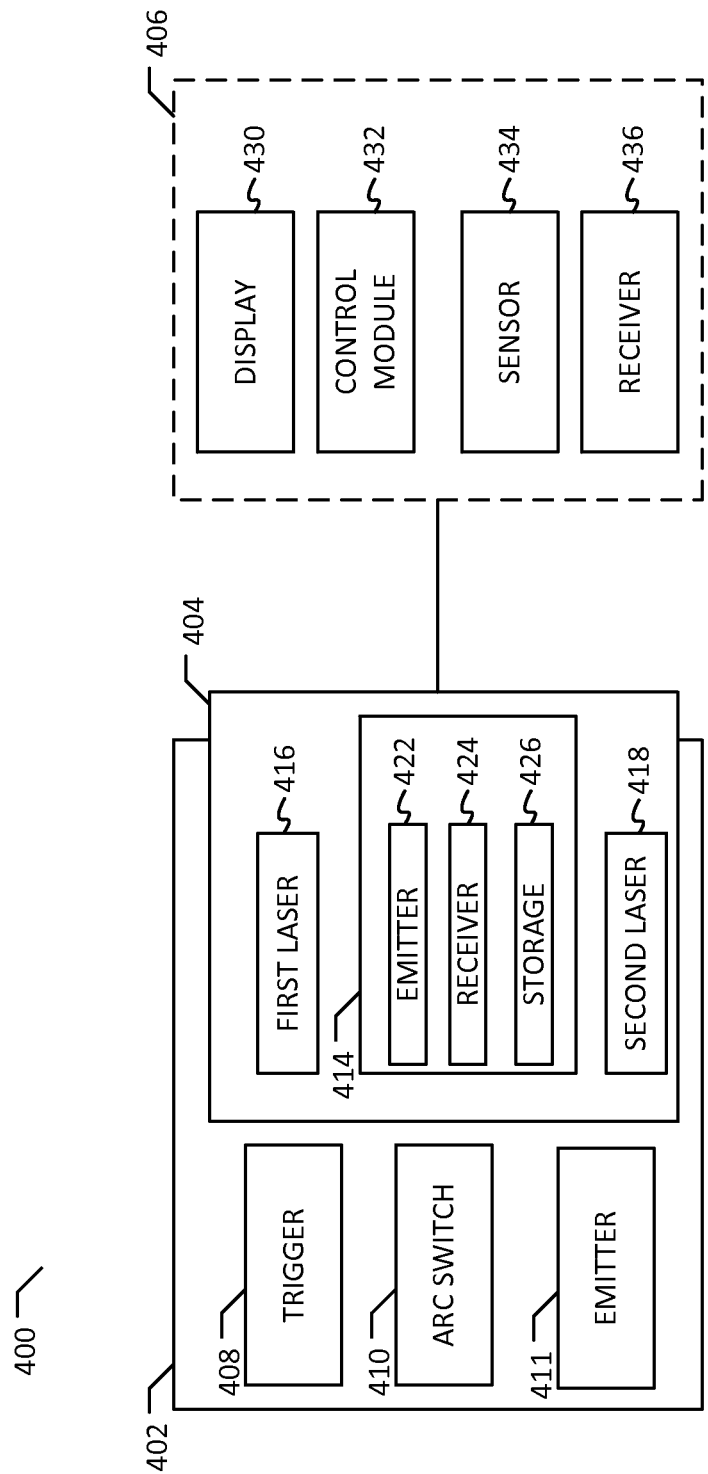
FIG. 4 is a block diagram of a disruptor device simulation system according to one embodiment of the present invention.

Referring to FIG. 4, a block diagram of a disrupter device simulation system 400 is illustrated. The disrupter device simulation system 400 can be similar to the first embodiment disruptor device simulation system 100.

The disrupter device simulation system 400 can include a disruptor device 402, a training cartridge 404, and a simulator system 406.

Generally, the disruptor device 402 can include a first button 408, a second button 410, and an emitter 411. It is to be appreciated that the disruptor device 402 can include more or less buttons. In one embodiment, the first button 408 can be a trigger and the second button 410 can be an arc switch found on a TASER® X2 CEW. The disruptor device emitter 411 can be adapted to emit a wireless signal including, but not limited to, a radio frequency signal, an infrared signal, and a Bluetooth signal.

In one embodiment, the training cartridge 404 can be configured similar to the first embodiment training cartridge 104. The training cartridge 404 can include a cartridge shell 412 (not shown), a control module 414, a first laser 416, and a second laser 418. In one embodiment, the cartridge shell 412 can be adapted to load into a TASER® X2 CEW.

The control module 414 can include an emitter 422, a receiver 424, and a nonvolatile storage 426. The emitter 422 can be adapted to transmit a signal including, but not limited to, a radio frequency signal, an infrared signal, and a Bluetooth signal. In one embodiment, the emitter 422 can be a light emitting diode (LED). The LED emitter 422 can generate an infrared signal to transmit data to the simulator system 406. It is to be appreciated that a variety of signals can be implemented with the present embodiment.

The receiver 424 can be adapted to receive one or more signals from the disruptor device emitter 411. Generally, the disruptor device emitter 411 can generate a first signal in response to the trigger 408 being activated and a second signal in response to the arc switch 410 being pressed. The receiver 424 can be adapted to receive the trigger pull signal and the arc switch signal from the disruptor device emitter 411.

The nonvolatile storage 426 can be adapted to store information pertaining to the training cartridge 404. For instance, information stored can include, but is not limited to, a type of training cartridge, an effective distance of virtual probes, wavelength of laser beams, and a serial number identifying the training cartridge. In one embodiment, information stored by the nonvolatile storage 426 can be sent to the simulator system 406 by the cartridge emitter 422. For instance, information stored by the nonvolatile storage 426 can be transmitted via the cartridge emitter 422 in response to the receiver 424 detecting the trigger pull signal and/or the arc switch signal.

Generally, the first laser 416 and the second laser 418 can be similar to the first embodiment lasers. The control module 414 can activate the first laser 416 and the second laser 418 in response to receiving the trigger pull signal. The first laser 416 and the second laser 418 can be adapted to simulate where a user would be shooting a pair of probes from a live cartridge if live cartridges were loaded in the disruptor device 402.

The simulator system 406 can include a display 430, a control module 432, a sensor 434, and a receiver 436. The control module 432 can be implemented similar to the first embodiment simulator system control module 122. The sensor 434 can be implemented to detect pulses of light generated by the first laser 416 and the second laser 418. The simulator receiver 436 can be adapted to detect signals from the cartridge emitter 422.

The control module 432 can be adapted to run a program or application which can run a plurality of training scenarios. In one embodiment, the simulator control module 432 can be adapted to alter a training scenario based on the sensor 434 and/or the receiver 436 detecting a signal from the cartridge emitter 422 or the first laser 416 and the second laser 418.

Generally, the training cartridge 404 can receive a signal from the disruptor device 402 indicating a trigger pull or an arc switch press. In response to receiving a trigger pull signal, the cartridge control module 414 can fire the first laser 416, fire the second laser 418, and emit a signal via the cartridge emitter 422. The signal emitted by the cartridge emitter 422 can contain information including, but not limited to, the cartridge fired, a cartridge identifier, and an indicator that the cartridge was fired. In response to receiving an arc switch signal, the cartridge control module 414 can emit a signal via the cartridge emitter 422. The emitted arc switch signal can contain information including, but not limited to, an indicator that the arc switch was pressed. In one embodiment, the emitter 422 can continuously send a signal as long as the arc switch is pressed.

In some embodiments, the disruptor device 402 can generate a plurality of signals. The plurality of signals can be transmitted by the disruptor device emitter 411. The plurality of signals can be adapted to be sent to the simulator system 406 via the training cartridge 404. The plurality of signals can include, but are not limited to, signals generated by the disruptor device when (i) a training cartridge is inserted into the disruptor device, (ii) a user pulls the trigger of the disrupter device, (iii) a user presses an arc switch of the disrupter device, (iv) a live cartridge is inserted in the disrupter device, and (v) a cartridge is removed from the disruptor device.

In one example, a disruptor device can have a first training cartridge and a second cartridge loaded. A program on the simulator system can be set to a semi-automatic mode meaning the training cartridges and the disrupter device are each set to a semi-automatic mode. A first time a user pulls the disruptor device trigger, the program can receive a signal indicating that the first training cartridge has been fired. If the disrupter device was pointed at a display, a sensor can detect pulses light from the infrared lasers and determine whether the shot hit an intended target. If the next action is another trigger pull, the system can look for a shot from the second cartridge and determine where that shot hit. If the user presses the arc switch as a second action before pulling the trigger a second time, the program can determine that the user is intending to provide a stimulus current to the target of the first cartridge. It is to be appreciated that the simulator system can be configured to accurately determine the intentions of a user based on a sequence of trigger pulls and arc switch presses.

A Third Embodiment of a Disrupter Device Simulation System

Figure 5:
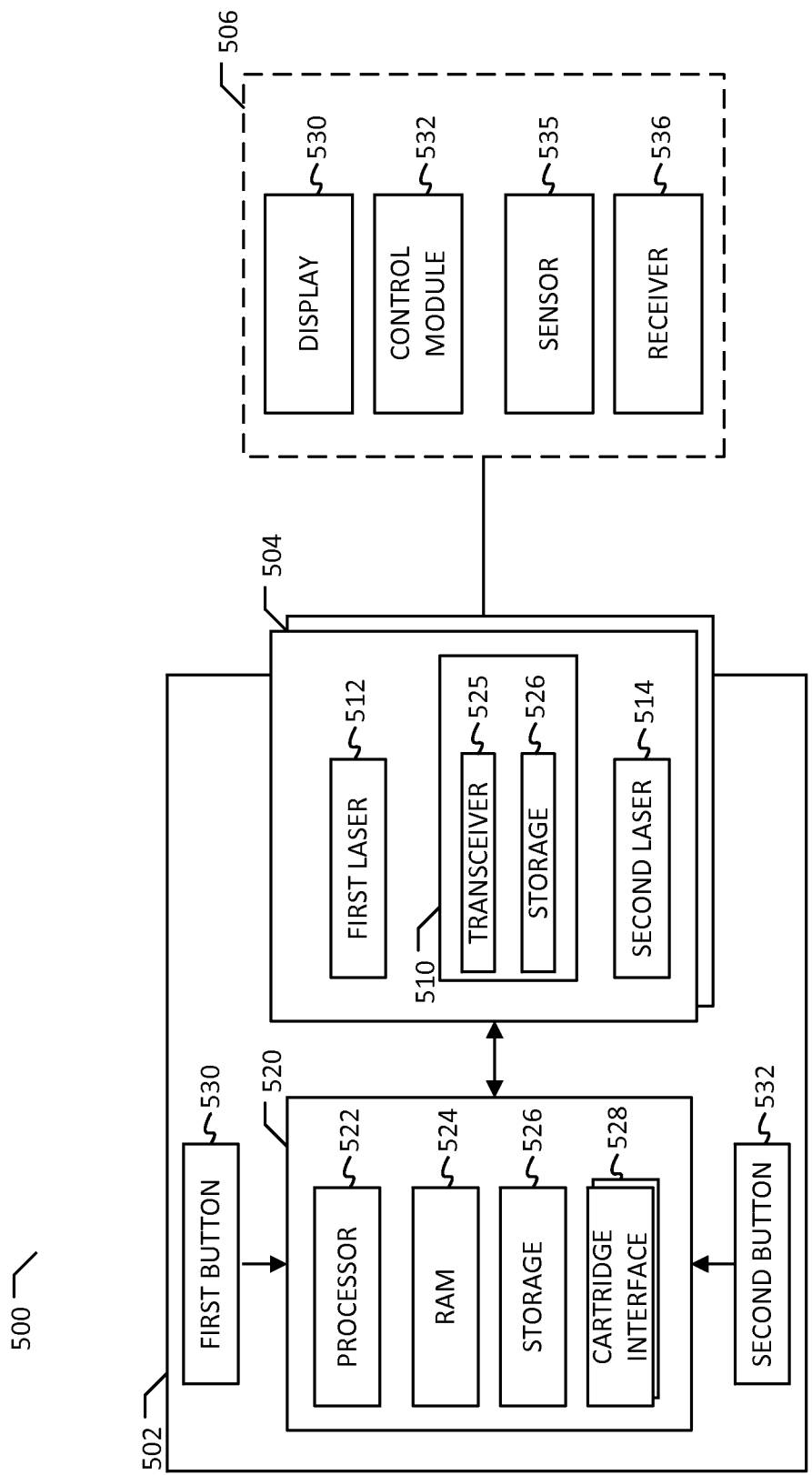
FIG. 5 is a block diagram of a disruptor device simulation system according to one embodiment of the present invention.

Referring to FIG. 5, a block diagram of a disrupter device simulation system 500 is illustrated. Generally, the disrupter device simulation system 500 can be implemented for training users on how to properly use a disrupter device.

The disrupter device simulation system 500 can include a smart disruptor device 502, one or more training cartridges 504, and a simulator system 506.

The training cartridge 504 can include a cartridge shell 508 (not shown), a control module 510, a first laser 512, and a second laser 514. The control module 510 can include a transceiver 516 and a nonvolatile storage 518. The control module 510 can be adapted to receive a signal from the disruptor device 502.

In one embodiment, the transceiver 516 can include a wireless signal emitter. For instance, the wireless signal emitter can be a light emitting diode (LED) that emits a pulse of light. In one example, the LED can emit a wavelength in the infrared light spectrum. It is to be appreciated that other non-visible parts of the light spectrum can be implemented without exceeding the scope of this disclosure. The transceiver 516 can be adapted to generate a signal including, but not limited to, a radio frequency signal, a Bluetooth signal, and an infrared signal. It is to be appreciated that a variety of wireless signals adapted to transmit data can be implemented in the present embodiment.

The smart disruptor device 502 can include a control module 520 adapted to send and receive signals from the training cartridge 504. In one embodiment, the control module 520 can include a processor 522, a random access memory 524, a nonvolatile storage 526 (or memory), and one or more cartridge interfaces 528. The processor 522 can be a single microprocessor, multi-core processor, or a group of processors. The random access memory 524 can store executable code as well as data that may be immediately accessible to the processor 522, while the nonvolatile storage 526 can store executable code and data in a persistent state. The cartridge interfaces 528 can include hardwired and wireless connections through which the control module 520 can communicate with the training cartridges 504.

In one embodiment, the disruptor device control module 520 can determine how the disruptor device will operate including, but not limited to, (i) whether the weapon will be in a semi-automatic mode, a manual mode, or a custom mode, (ii) which training cartridge will be fired first, (iii) the amount of charge per cartridge, and (iv) how long each charge will last. Furthermore, the disruptor device control module 520 can determine what type of cartridge has been loaded into the weapon. For instance, the disruptor device control module 520 can determine if a live cartridge and/or a training cartridge have been loaded. In one embodiment, the disruptor device 502 can generate a stop action signal when a live cartridge is loaded with a training cartridge. The stop action signal can be received by the training cartridge control module 510 and transmitted to the simulator system 506. The simulator system 506 can generate a visual and/or audible message to an instructor that the disruptor device 502 has been disabled until the live cartridge is removed. It is to be appreciated that a variety of means for informing a user to correctly load the disruptor device 502 can be implemented.

Generally, the disruptor device control module 520 can generate a first signal and a second signal. The first signal can be generated when a first button 530 of the disruptor device 502 is activated. The second signal can be generated when a second button 532 of the disruptor device 502 is activated. The first signal and the second signal can be sent to the cartridge control module 510 via the cartridge interfaces 528. In response to receiving the first signal, the cartridge control module 510 can activate the first laser 512, the second laser 514, and the transceiver 516. When the cartridge control module 510 receives the second signal, the transceiver 516 can be activated. In some embodiments, the cartridge control module 510 will activate the first laser 512, the second laser 514, and the transceiver 516 when receiving the second signal.

In both instances, where the first signal and the second signal are received by the cartridge control module 510, the transceiver 516 can transmit a data signal indicating whether the first button 530 or the second button 532 was pressed. If the data signal includes data that the first button was pressed, the simulator system 506 can process any laser beams detected prior to the simulator system 506 receiving the data signal. If the data signal indicates that the second button 532 was pressed, the simulator system 506 can ignore any laser beams detected prior to the simulator system 506 receiving the data signal. In one embodiment, the simulator system 506 can store each data signal received from the cartridge control module 510.

Generally, the cartridge control module 510 can receive a data signal from the disruptor device 502 after the training cartridge 504 is loaded into the disruptor device 502. Generally, the data signal can include information about a current setup of the disruptor device 502. For instance, the data signal can include, but is not limited to, whether a safety switch is engaged, what mode the disruptor device is in, how many cartridges are loaded, and information regarding each cartridge. The cartridge control module 510 can then transmit the data signal to the simulator system 506. The data signal can be used by the simulator system 506 to determine how each further data signal received from the training cartridge 504 should affect a training scenario.

In one example, the smart disruptor device 502 can be loaded with two training cartridges 504. The smart disruptor device 502 can determine the cartridges are training cartridges and send a data signal to a first active training cartridge indicating a current status of the smart disruptor device 502. The first active training cartridge can transmit a data signal to the simulator system 506. The simulator system 506 can setup a training scenario based on information contained in the data signal. As such, trainees can implement personal settings of their disruptor devices without manually inputting settings into the training scenario.

An Example Use of a Disruptor Device Implementing a Training Cartridge

A disruptor device can be loaded with two training cartridges. Each cartridge can include two lasers and an infrared emitter. A simulator system can be provided that projects training scenarios on a screen and, depending on actions of an instructor or the trainee, can branch the projected scenario in one of two or more paths. Prior to initiating a scenario, an instructor can determine operational parameters of the disruptor device and enter this information into the simulator system. If not already attached, an infrared receiver can be operatively coupled to the simulator system typically, but not necessarily, through a USB port.

The instructor can initiate the training scenario. A trainee generally responds as he/she believes is appropriate based on circumstances and situations presented in the training scenario. In a typical training scenario, the trainee will be required to use a disruptor device. In response to a situation in the training scenario, the trainee can fire the disruptor device at a person in the training scenario by pressing a trigger of the disruptor device. The press of the trigger can fire the two lasers in a first training cartridge of which a point of impact of the lasers beams with the display screen (typically life size) can be recorded. If the laser beams hit a location of a displayed person, the training scenario can typically branch to show an incapacitated person.

In one embodiment, the infrared emitter can transmit a signal indicating the trigger has been pulled to the simulator system. While the information from the emitter is typically redundant assuming the lasers impinge on the display screen, knowledge of the trigger pull can be vital in the rare circumstances where the trainee fails to hit the display screen at all.

In a semi-automatic mode, the disruptor device can automatically advance firing priority to the second training cartridge after the first training cartridge has been fired. A subsequent pull of the trigger can fire the lasers of the second training cartridge along with the infrared emitter. A push of an arc switch button before a trigger pull can cause the emitter to transmit a signal to the simulator system that the arc switch button has been pushed, which can cause the simulator system to branch to a video file wherein the person hit by the simulated projectiles of the first training cartridge receive an additional stimulus current.

Throughout a training scenario, the simulator can count trigger pulls and arc switch button depresses and based on the sequence and number of presses, the simulator system can determine based on an information resident in memory what the behavior of the disruptor device will be in relation to the action on the part of the trainee. By signifying the mode of the disruptor device prior to beginning of the scenario, the simulator system through appropriate information, such as a look up table, can determine what the button press or trigger pull caused the disruptor device to do.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

We claim:

1. A disruptor device training system comprising:
   a first cartridge having a first laser, a second laser, and a first emitter;
   a second cartridge having a third laser, a fourth laser, and a second emitter;
   a disruptor device, the disruptor device including:
      chambers for receiving the first cartridge and the second cartridge, the chambers consisting of:
         a right chamber configured to receive the first cartridge; and
         a left chamber configured to receive the second cartridge;
      a trigger; and
      an arc switch;
   wherein (i) when the trigger of the disruptor device is pressed the first laser and the second laser are activated, and (ii) when the arc switch of the disruptor device is pressed the first emitter is activated; and
   a simulator system that alters a training scenario based on (i) the first laser and the second laser being activated, (ii) the first emitter being activated, (iii) the third laser and the fourth laser being activated, and (iv) the second emitter being activated, wherein the simulator system includes:
      a display screen being generally life size;
      a sensor for detecting pulses of light generated from the first laser; and
      a receiver for detecting a signal generated by the emitter;
   wherein the training scenario includes a plurality of videos displayed by the simulator system on the display screen, the simulator system altering the training scenario by branching from one video to another video;
   wherein the disruptor device is a conducted electrical weapon and the first cartridge is inserted into the right chamber and the second cartridge is inserted into the left chamber of the conducted electrical weapon;
   wherein (i) the first laser, the second laser, the third laser, and the fourth laser each generate a pulse of light with the same wavelength, (ii) the first laser and the second laser generate the pulse of light for a first amount of time, (iii) the third laser and the fourth laser generate the pulse of light a second amount of time, and (iv) the first amount of time is different than the second amount of time.

2. The training system of claim 1, wherein the second laser is angled substantially seven degrees from parallel with the first laser.

3. The training system of claim 1, wherein the training scenario includes a plurality of paths and altering the training scenario includes branching from one of the plurality of paths to another path.

4. The training system of claim 1, wherein the emitter is an infrared emitter.

5. A disruptor device training system comprising:
   a first cartridge having a first laser, a second laser, and a first emitter;
   a second cartridge having a third laser, a fourth laser, and a second emitter;
   a conducted electrical weapon, the conducted electrical weapon including:
      chambers for receiving the first cartridge and the second cartridge, the chambers consisting of:
         a first chamber configured to receive the first cartridge;
         a second chamber configured to receive the second cartridge;
      a trigger; and
      an arc switch;
   the first cartridge being inserted into and electrically connected to the first chamber of the conducted electrical weapon and the second cartridge being inserted into and electrically connected to the second chamber of the conducted electrical weapon, wherein (i) the conducted electrical weapon generates a first signal when the trigger is pressed and a second signal when the arc switch is pressed, (ii) the first signal is adapted to activate the first laser, second laser, third laser, and fourth laser, and (iii) the second signal is adapted to activate the first emitter and the second emitter;

a training scenario including a plurality of videos;

a simulator system that (i) stores the training scenario, (ii) displays the training scenario, and (iii) alters the training scenario, wherein the simulator system includes:

a display screen;

a sensor for detecting pulses of light generated from the first laser, the second laser, the third laser, and the fourth laser; and a receiver for detecting a signal generated by the first emitter and the second emitter;

wherein the simulator system alters the training scenario by branching from one video to another video based on (i) the first laser and the second laser being detected, (ii) the first emitter being detected, (iii) the third laser and the fourth laser being detected, and (iv) the second emitter being detected.

6. The training system of claim 3, wherein when (i) the trigger is pressed a first time the first laser and the second laser are activated, and (ii) the trigger is pressed a second time the third laser and the fourth laser are activated.

7. The training system of claim 6, wherein when (i) the arc switch is pressed a first time the first emitter is activated, and (ii) the arc switch is pressed a second time the second emitter is activated.

8. The training system of claim 5, wherein the training scenario includes a plurality of paths, each of the plurality of paths including a different video.

9. The training system of claim 8, wherein the training scenario changes from one of the plurality of paths to another path based on the first laser and the second laser being detected.

10. The training system of claim 8, wherein the scenario changes from one of the plurality of paths to another path based on the first emitter being detected.

11. The training system of claim 8, wherein the training scenario changes from one of the plurality of paths to another path based on (i) the second emitter being detected, and (ii) the third laser and the fourth laser being detected.

12. The training system of claim 1, wherein the first emitter and the second emitter each generate an omnidirectional signal when activated.

13. The training system of claim 1, wherein the pulses of light generated by the first laser, the second laser, the third laser, and the fourth laser are unidirectional.

14. The training system of claim 3, wherein each of the plurality of paths include a different video.

* * * * *